(12) United States Patent
Weast et al.

(10) Patent No.: US 10,732,582 B2
(45) Date of Patent: Aug. 4, 2020

(54) TECHNOLOGIES FOR MANAGING SENSOR MALFUNCTIONS

(71) Applicant: Intel Corporation, Santa Clara, CA (US)

(72) Inventors: John C. Weast, Portland, OR (US); Tobias M. Kohlenberg, Portland, OR (US); Brian D. Johnson, Portland, OR (US)

(73) Assignee: Intel Corporation, Santa Clara, CA (US)

(*) Notice: Subject to any disclaimer, the term of this patent is extended or adjusted under 35 U.S.C. 154(b) by 348 days.

(21) Appl. No.: 14/998,268

(22) Filed: Dec. 26, 2015

(65) Prior Publication Data

US 2017/0185078 A1 Jun. 29, 2017

(51) Int. Cl.
*G05B 13/02* (2006.01)
*G05B 23/02* (2006.01)
*H04W 4/80* (2018.01)

(52) U.S. Cl.
CPC ......... *G05B 13/02* (2013.01); *G05B 23/0297* (2013.01); *H04W 4/80* (2018.02)

(58) Field of Classification Search
CPC ............................ H04W 4/008; G05B 23/0297
See application file for complete search history.

(56) References Cited

U.S. PATENT DOCUMENTS

| 2005/0140358 | A1 | 6/2005 | Kennedy et al. |
| 2011/0153035 | A1 | 6/2011 | Grichnik et al. |
| 2013/0261853 | A1 | 10/2013 | Shue et al. |
| 2014/0067124 | A1 | 3/2014 | Williamson et al. |
| 2017/0109644 | A1* | 4/2017 | Nariyambut Murali ...... G06N 7/005 |
| 2017/0351261 | A1* | 12/2017 | Levinson ............. G05D 1/0291 |

OTHER PUBLICATIONS

International search report for PCT application No. PCT/US2016/063579, dated Mar. 13, 2017 (3 pages).
Written opinion for PCT application No. PCT/US2016/063579, dated Mar. 13, 2017 (6 pages).
Jelena Frtunikj et al., "Adaptive Error and Sensor Management for Autonomous Vehicles: Model-based Approach and Run-time System," In: 4th International Symposium on Model Based Safety Assessment (IMBSA 2014), Oct. 27-29, 2014.

* cited by examiner

*Primary Examiner* — Ajay Ojha
(74) *Attorney, Agent, or Firm* — Barnes & Thornburg LLP

(57) ABSTRACT

Technologies for managing sensor malfunctions in a compute system include detecting a malfunctioning sensor of the compute system and determining a sensor function performed by the malfunctioning sensor. In response to detection of the malfunctioning sensor, a different sensor of the compute system is selected to perform the sensor function of the malfunctioning sensor. The selected sensor may be of a different sensor type relative to the sensor type of the malfunctioning sensor. The compute system subsequently performs the sensor function of the malfunctioning sensor using the selected sensor. To do so, the compute system may increase, modify, or adjust the manner in which the sensor data from the selected sensor is processed.

19 Claims, 4 Drawing Sheets

TECHNOLOGIES FOR MANAGING SENSOR MALFUNCTIONS

BACKGROUND

Sensors and sensing circuits are incorporated in an ever-growing number of electronic devices and computing systems. For example, many automated or autonomous systems, such as autonomous vehicles and robots, rely on various sensors for knowledge of the surrounding environment and to facilitate interactions with that environment, such as path finding. The use of sensors in such autonomous systems is akin to human senses.

Due to safety considerations and a desire for known failure states, many autonomous systems handle sensor failure by implementing a shut-down failure mode. For example, an autonomous vehicle may come to a stop, automatically move to the shoulder of the road, or shift to a driver-controlled state in response to the loss of a sensor. Similarly, a robot may simply shut down in response to a malfunctioning sensor. Such shut-down failure modes often fail to consider the actual impact of the loss of a particular sensor or provide any supplemental operational mode to allow the autonomous system to continue operation in some capacity.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
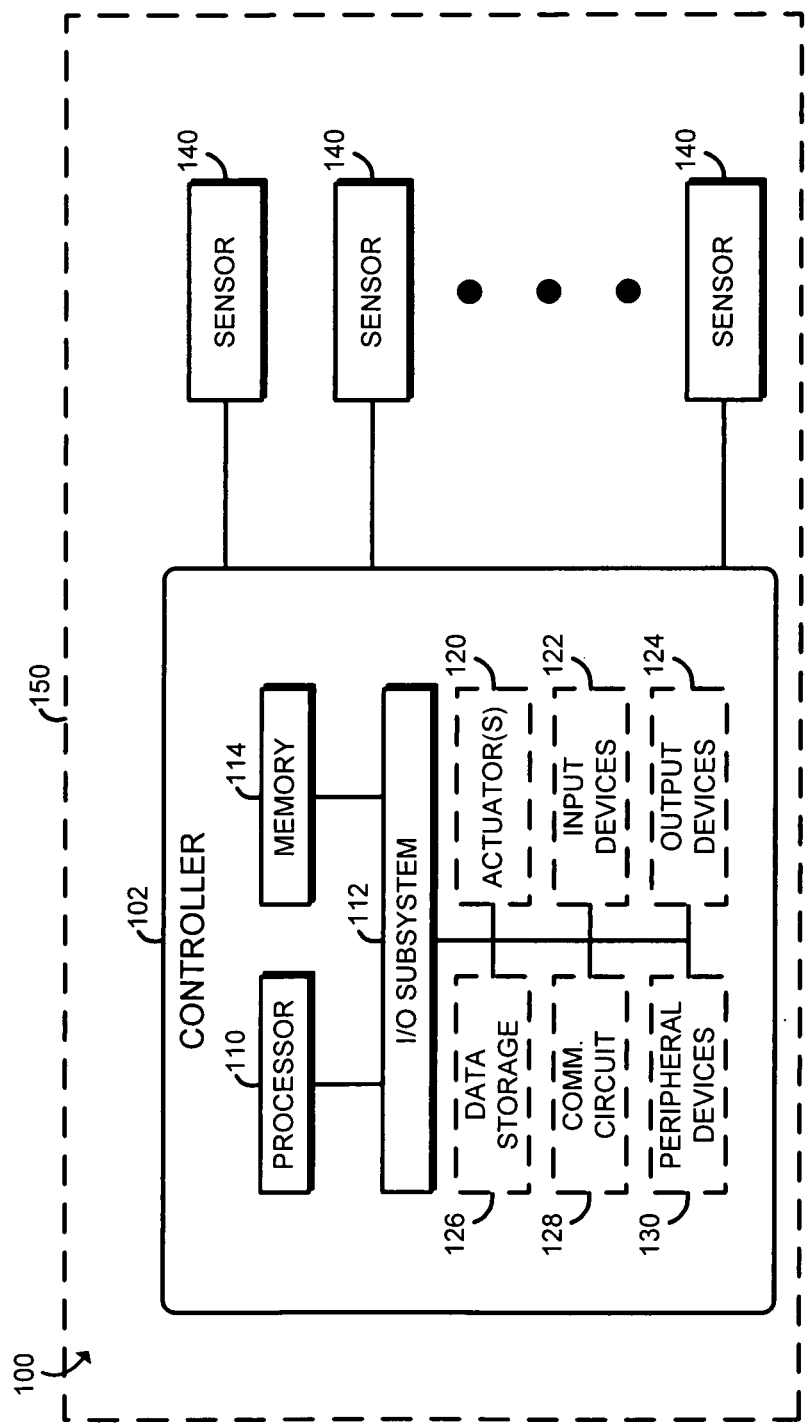
FIG. 1 is a simplified block diagram of at least one embodiment of a system for managing sensor malfunctions.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute system 100 for managing sensor malfunctions includes a controller 102, which receives sensor data produced by an array of sensors 140. In typical fashion, each of the sensors 140 produces sensor data in response to a detected stimulus (e.g. motion, temperature, light, pressure, electrical connectivity, etc.). As such, each sensor 140 performs a corresponding sensor function for the compute system 100 to detect a particular context of the controller 102 and/or environment in which the controller 102 is operating. For example, a motion sensor 140 may perform the sensor function of detecting motion of the controller 102, while a temperature sensor 140 may perform the sensor function of detecting a temperature of a surrounding environment of the controller 102.

Illustratively, the controller 102 forms a portion of an automated compute system 150, such as an autonomous vehicle, robot, or other intelligent compute system. The controller 102 utilizes the sensor data produced by the sensors 140 to control various operations of the automated compute system 150 and/or compute system 100. For example, the controller 102 may utilize the sensor data to control movement of the automated compute system 150 and/or other functionality of the automated compute system 150 and/or compute system 100. In addition to such control functions, the controller 102 is configured to monitor operation of the various sensors 140 to determine when a sensor 140 is malfunctioning. The determination that a sensor 140 is malfunctioning may be indicative that the corresponding sensor 140 is inoperable (e.g., broken in some manner) or simply that the produced sensor data is unreliable or otherwise invalid (e.g., temporarily unreliable due to environmental conditions). However, rather than entering a critical failure mode (e.g., a shut-down mode) in response to detection of a malfunctioning sensor 140, the controller 102 is configured to determine one or more other sensors 140 useable to perform the sensor function typically performed by the malfunctioning sensor 140.

In relying on the one or more other sensors 140 to perform the sensor function typically performed by the malfunctioning sensor 140, the controller 102 may modify or adjust the manner in which sensor data from the other sensor(s) 140 is processed by the controller 102 so as to compensate for the loss of the malfunctioning sensor 140. The controller 102 may, for example, increase the amount of resources used by a processor of the controller 102 to process the sensor data produced by the other sensor(s) 140, modify a processing algorithm used to process the sensor data produced by the other sensor(s) 140, and/or process the sensor data produced by the other sensor(s) 140 in a different manner to obtain information indicative of the sensor function typically performed by the malfunctioning sensor 140. For example, if a camera sensor 140 typically used for navigation functions malfunctions, the controller 102 may select one or more microphone sensors 140 of the compute system 100 to replace the sensor function typically performed by the camera sensor 140 (i.e., to provide navigation information). In doing so, the controller 102 may increase the processor resources used to process the audio data from the microphone sensor(s) 140 to allow the controller 102 to perform navigation functions (e.g., by analyzing the audio data in greater detail to facilitate navigation via echo location and/or sound origination location). Conversely, if a microphone sensor 140 typically used for voice control malfunctions, the controller 102 may select a camera sensor 140 of the compute system 100 to replace the sensor function of the microphone sensor 140 (i.e., to receive input from a user). In doing so, the controller 102 may increase processor resources used to process image data from the camera sensor 140 to perform user input sensor functions (e.g., by analyzing the image data to determine spoken words of the user based on lip reading). In this way, the controller 102 is configured to increase reliance on other sensors 140 of the compute system 100 when a sensor 140 malfunctions in a manner similar to how humans increase reliance on remaining senses (e.g., hearing) when faced with the loss of one of the six senses (e.g., vision).

The controller 102 may be embodied as any type of compute circuit, device, or system configured to control functionality of a system including multiple sensors, such as the automated compute system 150, and perform the functions described herein. For example, the controller 102 may be embodied as or otherwise include, without limitation, a computer, a compute device, a sensor fusion computer, an in-vehicle compute device, an analysis compute device, a multiprocessor system, a processor-based system, a server, a server system, a networking device, a consumer electronic device, a smartphone, a tablet computer, a notebook computer, a laptop computer, a desktop computer, a wearable computer, a smart accessory such as a smart watch or smart glasses, a messaging device, and/or any other computing device capable of utilizing various sensors. As shown in FIG. 1, the illustrative controller 102 includes a processor 110, an I/O subsystem 112, and a memory 114. Of course, the controller 102 may include other or additional components, such as those commonly found in a computer device 2 (e.g., various input/output devices), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. The processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the controller 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the controller 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processors 110, the memory 114, and other components of the controller 102, on a single integrated circuit chip.

In some embodiments, the controller 102 may also include one or more actuators 120. In such embodiments, the actuators 120 may be embodied as any type of actuator device controllable by the components of the controller 102. For example, the actuators 120 may be embodied as, or otherwise include, linear actuators, motors, hydraulic actuators, engines, and/or other devices capable of producing work and controllable by the controller 102. For example, in embodiments in which the controller 102 forms a portion of an automated compute system 150, such as an autonomous vehicle or robot, the actuators 120 may include one or more electric motors to provide propulsion to the automated compute system or otherwise allow the automated compute system 150 to interact with the environment (e.g., a motorized arm). Of course, the actuators 120 may include additional or other types of actuators in other embodiments to perform various functions of the controller 102, the compute system 100, and/or the automated compute system 150.

Depending on the particular embodiment, the controller 102 may also include one or more input devices 122 and/or one or more output devices 124. The input devices 122 may be embodied as, or otherwise include, any type of device capable of supplying input to the controller 102 or for which the controller 102 may utilize to obtain input data. For example, the input devices 122 may include, but are not limited to, a keyboard, a touchscreen, a mouse, and/or other input devices. Similarly, the output devices 124 may be embodied as, or otherwise include, any type of device capable of producing an output from the controller 102. For example, the output devices 124 may include, but are not limited to, a display, a speaker, a horn, and/or other output devices.

In some embodiments, the controller 102 may also include a data storage 126, communication circuitry 128, and/or other peripheral devices 130. The data storage device 126 may be embodied as any type of device or devices configured for short-term or long-term storage of data such as, for example, memory devices and circuits, memory cards, hard disk drives, solid-state drives, or other data storage devices. The communication circuitry 128 may be embodied as any communication circuit, device, or collection thereof, capable of enabling communications between the controller 102 and other devices. To do so, the communication circuitry 128 may be configured to use any one or more communication technology (e.g., wired or wireless communications) and associated protocols (e.g., Ethernet, Bluetooth®, Wi-Fi®, WiMAX, etc.) to effect such communication. The peripheral devices 130 may be embodied as, or otherwise include, any type of additional input/output devices, interface devices, and/or other components and/or devices commonly found in a compute system including, but not limited to, graphics circuitry, network interface, additional processing circuitry, and/or other input/output devices, interface devices, and/or peripheral devices.

The sensors 140 may be embodied as, or otherwise include, any type of sensor, sensing circuit, or sensor device capable of measuring or otherwise capturing data indicative of sensed stimuli. For example, the sensors 140 may include, but are not limited to, environmental sensors such as temperature or barometric pressure sensors, motion sensors such as accelerometers, biometric sensors such as hear rate sensors or galvanic skin response sensors, authentication sensors such as fingerprint scanner sensors, artificial sense sensors such as cameras or microphones, measurement sensors such as pressure or light sensors, and/or any other type of sensor capable of producing sensor data indicative of a sensed stimulus. As discussed above, each sensor 140 performs a corresponding sensor function for the compute system 100 to detect a particular context of the controller 102 and/or environment in which the controller 102 is operating. For example, a motion sensor 140 may detect motion, a temperature sensor 140 may detect temperature, an audio sensor 140 may detect audible commands, an elevation sensor 140 may detect change in elevation, a camera sensor 140 may detect navigation information, a radar sensor 140 may detect distance information, and so forth. In some cases, an individual sensor 140 may perform multiple sensor functions (e.g., a camera sensor 140 may be used for navigation sensor functions as well as user identification sensor functions). The particular sensor function performed by each sensor 140 may be defined by the type of sensor data produced by the sensor 140 and/or the manner in which the controller 102 utilizes the produced sensor data. As such, the particular sensor function performed by a particular sensor 140 may change over time based on operation conditions or the like.

As discussed above, the controller 102 and the compute system 100 form a portion of an automated compute system 150 in the illustrative embodiment. The automated compute system 150 may be embodied as any type of system or device configured to perform a function in an automated fashion in reliance on sensor data produced by the sensors 140. For example, the automated compute system 150 may be embodied as autonomous vehicle, a robot, a smart appliance, and/or other intelligent compute system.

Figure 2:
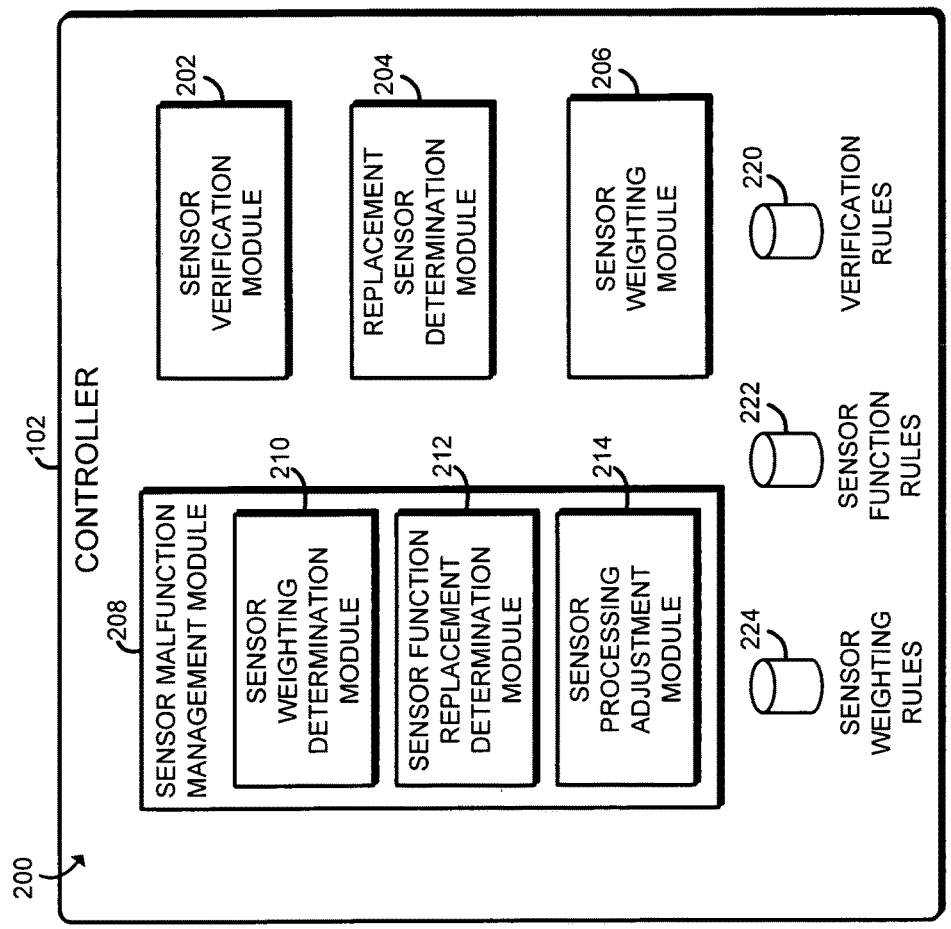
FIG. 2 is a simplified block diagram of at least one embodiment of an environment that may be established by a controller of the system of FIG. 1.

Referring now to FIG. 2, in an illustrative embodiment, the controller 102 establishes an environment 200 during operation. The illustrative environment 200 includes a sensor verification module 202, a replacement sensor determination module 204, a sensor weighting module 206, and a sensor malfunction management module 208. The various modules of the environment 200 may be embodied as hardware, firmware, software, virtualized hardware, emulated architecture, or a combination thereof. As such, in some embodiments, one or more of the modules of the environment 200 may be embodied as circuitry or collection of electrical devices (e.g., a sensor verification circuit 202, a replacement sensor determination circuit 204, a sensor weighting circuit 206, and a sensor malfunction management circuit 208, etc.). It should be appreciated that, in such embodiments, one or more of the sensor verification circuit 202, the replacement sensor determination circuit 204, the sensor weighting circuit 206, and/or the sensor malfunction management circuit 208 may form a portion of one or more of the processor 110, the I/O subsystem 112, and/or other components of the controller 102. Additionally, in some embodiments, one or more of the illustrative modules may form a portion of another module and/or one or more of the illustrative modules may be independent of one another. During use, the various modules of the environment 200 may generate and/or utilize various data including, but not limited to, verification rules 220, sensor function rules 222, and sensor weighting rules 224.

The sensor verification module 202 is configured to verify that each sensor 140 is operating correctly. To do so, the sensor verification module 202 may utilize the verification rules 220, which may define various operational characteristics for each sensor 140. For example, the verification rules 220 may define an acceptable or expected range of sensor data, the type of sensor data expected, electrical power levels for the sensors, and/or other operational characteristics. As such, the sensor verification module 202 may utilize any suitable methodology, algorithm, and/or test to verify the operation of each sensor 140.

The replacement sensor determination module 204 is configured to analyze each sensor 140 of the compute system 100 (or a subset of the sensors 140) and determine one or more sensors 140 that may be used by the controller 102 to replace that particular sensor 140 in the event that particular sensor 140 malfunctions. The replacement sensor determination module 204 may utilize any suitable methodology or algorithm to determine the other sensor(s) 140 usable to replace each sensor 140 of the compute system 100 (or subset thereof). For example, in the illustrative embodiment, the replacement sensor determination module 204 is configured to determine the sensor function performed by each sensor 140 and determine one or more other sensors 140 of the compute system 100 that may be used, alone or in aggregation, to perform that particular sensor function. The replacement sensor determination module 204 subsequently generates a set of sensor function rules 222 that define which sensors 140 are usable by the controller 102 to perform the sensor function of each other sensor 140 (or subset of other sensors 140). To do so, in some embodiments, the replacement sensor determination module 204 may utilize a machine learning or deep learning algorithm to analyze the sensor data from each sensor 140 and learn which sensor 140 may be used to perform the sensor functions of other sensors 140 over time (e.g., during a training period). It should be appreciated that the sensors 140 selected to replace a particular sensor 140 may be of a different sensor type from the sensor being replaced (e.g., a microphone sensor used to perform the sensor function of a malfunctioning camera sensor). In some embodiments, the machine learning algorithms employed by the controller 102 may rely on an initial training set of "hard-coded" sensor function rules 222, which the controller 102 updates over time during the training period. In other embodiments, the sensor function rules 222 may be embodied as, or otherwise include, simple "hard-coded" sensor functions rules that define which sensor(s) 140 may be used to perform the sensor function of each other sensor 140.

The sensor weighting module 206 is configured to determine a weight value associated with each sensor 140 of the compute system 100. To do so, the sensor weighting module 206 may determine a level of importance or criticality of each sensor 140. The level of importance of each sensor 140 may be based on various considerations and/or characteristics of the compute system 100 and/or the automated compute system 150. For example, the sensor weighting module 206 may apply a high weight value to sensors 140 associated with safety or other critical functions of the compute system 100. Conversely, the sensor weighting module 206 may apply a low weight value to sensors 140 associated with non-critical functions of the compute system 100, such as convenience features (e.g., sensors associated with heated seats or entertainment systems). In some embodiments, the weight value applied to a sensor 140 may be based on the type of sensor data produced by that particular sensor. Additionally, in some embodiments, multiple weight values may be assigned or determined for each sensor 140. For example, a particular sensor 140 may have a different weight value based on the present operation environment (e.g., a normal weight value for normal operation environments and a different weight value for hazardous environments, such as snow or rain environments). The sensor weighting module 206 may utilize any suitable algorithm or methodology to determine the weight values for each sensor 140 including, but not limited to, machine learning algorithms, deep learning algorithms, hard-coded rules, and/or other methodologies. The sensor weighting module 206 stores the determined weight values as a set of sensor weighting rules 224, which are usable by the controller 102 to determine a present weight value of a malfunctioning sensor or sensors as discussed below.

The sensor malfunction management module 208 is configured to monitor operation of the sensors 140 to determine whether any sensor 140 is malfunctioning. If so, the sensor malfunction management module 208 is configured to compensate for the loss of the malfunctioning sensor 140 using other sensors 140 of the compute system 100 as discussed below. The illustrative sensor malfunction management module 208 includes a sensor weighting determination module 210, a sensor function replacement determination module 212, and a sensor processing adjustment module 214. The sensor weight determination module 210 is configured to determine the weight of the malfunctioning sensor 140 and determine whether the controller 102 has experienced a critical failure based on the weight value. In the illustrative embodiment, the sensor weighting determination module 210 may determine the weight for the malfunctioning sensor 140 based on the sensor weighting rules 224 determined by the sensor weighting module 206, but may use other methodologies for determining the corresponding weight value in other embodiments. As discussed above, the weight value of each sensor 140 is indicative of the importance or criticality of that particular sensor. The weight value may be based on, for example, the sensor data produced by the malfunctioning sensor 140, the present operational environment, and/or other characteristics of the malfunctioning sensor 140, the controller 102, the compute system 100, the automated compute system 150, and/or other criteria.

The sensor weighting determination module 210 is further configured to compare the determined weight value to a weight threshold value to determine whether the loss of that particular sensor 140 is a critical loss. If the weight value of the malfunctioning sensor 140 does not satisfy the threshold weight value (e.g., is not less than the threshold value), the controller 102 shifts to a pre-defined critical failure operation mode (e.g., a safety mode in which only those component of the controller 102 or automated compute system 150 required to safely shut down the controller 102 or automated compute system 150 are powered). If multiple sensors 140 are malfunctioning, the sensor weighting determination module 210 is configured to sum the weights of each malfunctioning sensor 140 to determine the total weight of the malfunctioning sensors 140 and compare that total weight to the weight threshold value to determine whether the controller 102 has experienced a critical failure.

If the controller 102 has not experienced a critical failure (i.e., the weight value of the malfunctioning sensors 140 satisfies the threshold weight threshold value), the sensor function replacement determination module 212 is configured to determine one or more other sensors 140 of the compute system 100 to replace the malfunctioning sensor 140. That is, the sensor function replacement determination module 212 identifies or selects one or more other sensors 140 of the compute system 100 to perform the sensor function typically performed by the malfunctioning sensor 140. To do so, the sensor function replacement determination module 212 may determine the sensor function performed by the malfunctioning sensor 140 and compare that sensor function to the sensor function rules 222 to determine which one or more other sensors 140 may be used to perform that particular sensor function. For example, the sensor function replacement determination module 212 may determine that a wheel slip detection sensor 140 may be used to perform the sensor function of rain detection typically performed by a rain detection sensor. In some embodiments, two or more sensors 140 may be identified that, in aggregation, are capable of performing the sensor function of the malfunctioning sensor 140. For example, two two-dimensional camera sensors 140 may be selected to perform the sensor function of distance identification typically performed by a malfunctioning proximity sensor 140.

The sensor processing adjustment module 214 is configured to adjust the manner in which the sensor data produced from the selected replacement sensors 140 is processed so as to replicate the sensor function of the malfunctioning sensor 140. For example, the sensor processing adjustment module 214 may increase or modify the allocation of resources of the processor 110 or other components of the controller 102 used to process the sensor data from the replacement sensor 140. Additionally or alternatively, the sensor processing adjustment module 214 may modify or adjust a processing algorithm used to process the sensor data so as to extract or obtain additional or new information from the sensor data to facilitate the performance of the sensor function of the malfunctioning sensor 140. For example, if an internal microphone sensor 140 (e.g., voice command sensor) has been selected to replace a malfunctioning external proximity sensor 140 (e.g., a collision detection sensor), the sensor processing adjustment module 214 may increase the sensitivity threshold of the audio data received from the internal microphone sensor 140 such that the proximity of nearby external objects may be determined based on an echo location analysis or analysis process of the sensor data. Any characteristic of the manner in which the sensor data of the replacement sensor 140 is typically processed may be changed, adjusted, or otherwise modified by the sensor processing adjustment module 214 to achieve the sensor function of the malfunctioning sensor 140. Additionally, in embodiments in which multiple sensors 140 have been identified to perform the sensor function of the malfunctioning sensor 140, the sensor data from each of the replacement sensors 140 may be adjusted or modified by the sensor processing adjustment module 214.

Figure 3:
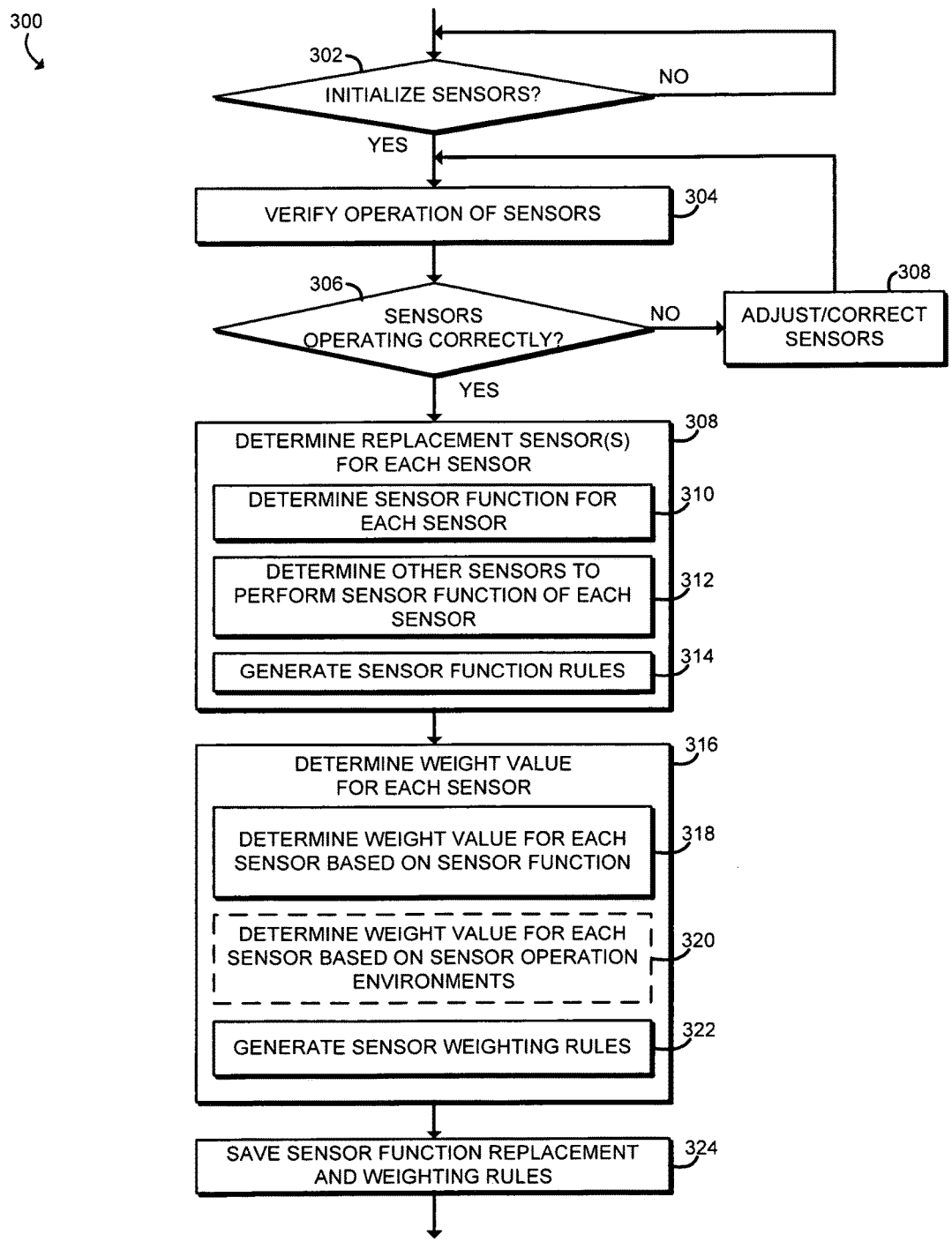
FIG. 3 is a simplified flow diagram of at least one embodiment of a method for initializing sensors that may be executed by the controller of the system of FIGS. 1 and 2.

Referring now to FIG. 3, in use, the controller 102 may execute a method 300 for initializing the sensors 140 of the compute system 100. The method 300 begins with block 302 in which the controller 102 determines whether to initialize the sensors 140. For example, the sensors 140 may be initialized upon every power up of the controller 102 or initialized only during a training period as discussed below. If the sensors 140 are to be initialized, the method 300 advances to block 304 in which the controller 102 verifies the operation of each sensor 140 of the compute system 100 utilizing the verification rules 220. As discussed above, the verification rules 220 define acceptable or expected operational characteristics of each sensor 140. In block 306, the controller 102 determines whether each sensor 140 of the compute system 100 was successfully verified. If not, the method 300 advances to block 308 in which the unverified or otherwise inoperable sensor(s) 140 are adjusted or corrected. For example, any inoperable sensors 140 may be recalibrated or otherwise replaced with properly functioning sensors 140 in block 308. The method 300 subsequently loops back to block 304 in which the controller 102 continues to verify the proper operation of all sensors 140 of the compute system 100.

Referring back to block 306, if the controller 102 determines that each sensor 140 of the compute system 100 is operating correctly (i.e., the controller 102 has successfully verified each sensor 140), the method 300 advances to block 308. In block 308, the controller 102 determines, for each sensor 140 of the compute system 100, one or more other sensors 140 usable by the controller 102 to replace that particular sensor 140 in the event that particular sensor 140 malfunctions. To do so, in block 310, the controller 102 may determine the sensor function performed by each sensor 140 of the compute system 100. Subsequently, in block 312, the controller 102 determines, for each sensor 140, one or more other sensors 140 of the compute system 100 usable by the controller 102 to perform the sensor function of the particular sensor 140. As discussed above, the controller 102 may utilize a machine learning algorithm or deep learning algorithm to analyze the sensor data from each sensor 140 and learn which sensor(s) 140 may be used to perform the sensor functions of other sensors 140. Of course, in other embodiments, such information may be hard-coded or otherwise provided to the controller 102 by a user or manufacture of the controller 102. Subsequently, in block 314, the controller 102 may generate sensor function rules based on the determined replacement sensor(s) 140. The sensor function rules define, for each sensor 140, which other sensor(s) 140 may be used to replicate the sensor function of that particular sensor 140.

After the controller 102 identifies, for each sensor of the compute system 100, one or more other sensors 140 usable to perform the sensor function of each respective sensor 140, the method 300 advances to block 316. In block 316, the controller 102 determines a weight value for each sensor 140 of the compute system 100. As discussed above, the weight value of each sensor 140 is indicative of a level of importance or criticality of the respective sensor 140. The controller 102 may utilize any suitable methodology to determine or assign a weight value to each sensor 140. For example, in block 318, the controller may determine a weight value for a particular sensor 140 based on the sensor function performed by that particular sensor. Additionally or alternatively, the controller 102 may assign a weight value to a particular sensor based on the sensor data produced by that particular sensor 140. In some embodiments, as discussed above, a particular sensor 140 of the compute system 100 may have multiple weight values assigned to it. For example, in block 320, the controller 102 may determine a weight value for a particular sensor based on one or more operation environments (e.g., a normal weight value and a different weight value for hazardous environments). Regardless, after the controller 102 determines or assigns the weight values for each sensor 140, the controller 102 may generate the sensor weighting rules 224 in block 322. As discussed above, the sensor weighting rules define a weight value for a particular sensor 140 of the compute system 100. Again, as discussed above, the weight value for the particular sensor 140 may vary according to other criteria such as the present operation environment.

After the controller 102 determines the sensor function rules 222 in block 308 and the sensor weighting 224 rules in block 316, the controller 102 may store the sensor function rules 222 and the sensor weighting rules 224. For example, the controller 102 may store the sensor function rules 222 and the sensor weighting rules 224 in the data storage 126.

Figure 4:
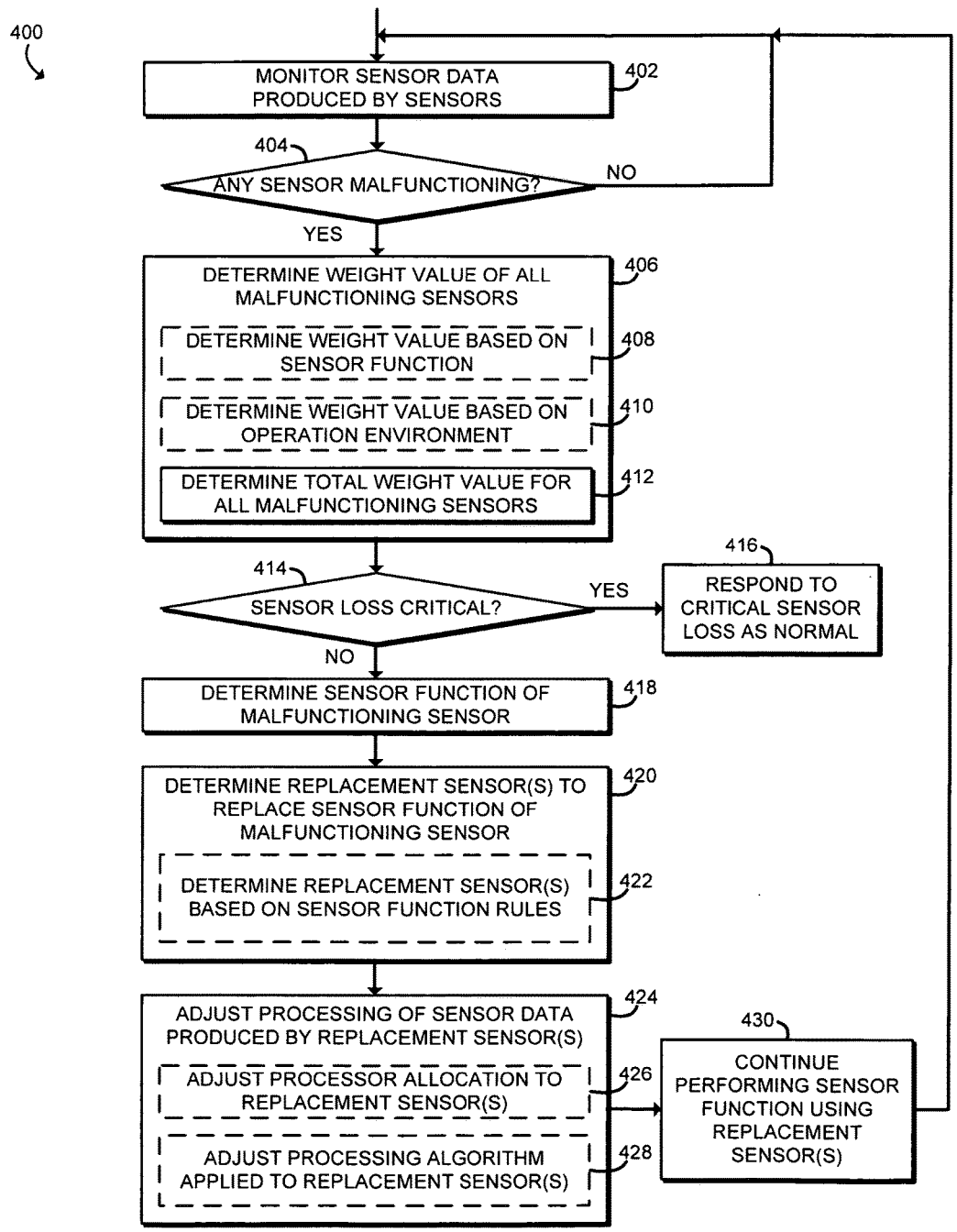
FIG. 4 is a simplified flow diagram of at least one embodiment of a method for managing sensor malfunctions that may be executed of the controller of the system of FIGS. 1 and 2.

Referring now to FIG. 4, in use, the controller 102 may execute a method 400 for managing sensor malfunctions. The method 400 begins with block 402 in which the controller 102 monitors sensor data produced by the sensor 140. For example, the controller 102 may continually or periodically receive sensor data from the sensors 140 and/or poll the sensors 140 to obtain the sensor data. Regardless, in block 404, the controller 102 determines whether any sensor 140 of the compute system 100 is malfunctioning. To do so, the controller 102 may utilize any methodology to determine whether a particular sensor 140 is malfunctioning. Additionally such determination may be based on the sensor data (or lack thereof) produced by a particular sensor, on operation characteristics of the particular sensor 140, and/or other criteria. In the illustrative embodiment, the controller 102 is configured to compare the sensor data produced by the each sensor 140 and/or other operational characteristics of each sensor 140 to the verification rules 220 to determine whether the corresponding sensor 140 is malfunctioning. As discussed above, the controller 102 may consider a sensor 140 to be malfunctioning if it is inoperable (e.g., not producing any sensor data) or if the sensor data produced by the particular sensor is unreliable or otherwise invalid (e.g., due to a temporary environment condition). Of course, in some embodiments, the controller 102 may not actively monitor the sensors 140 for malfunctions. Rather, the sensors 140 may notify the controller 102 of any problems. Additionally, in some embodiments, the monitoring of the sensors 140 may be simplistic (e.g., handled by a small watchdog routine). Regardless, if the controller 102 determines that no sensor 140 of the compute system 100 is malfunctioning, the method 400 loops back to block 402 in which the controller 102 continues monitoring the operation of the sensors 140. If, however, the controller 102 detects one or more malfunctioning sensors 140, the method 400 advances to block 406.

In block 406, the controller 102 determines a weight value for each malfunctioning sensor. To do so, the controller 102 may be configured to determine the weight value for each malfunctioning sensor based on the sensor function performed by each malfunctioning sensor in block 408. Additionally or alternatively, in block 410, the controller 102 may determine the weight value for each malfunctioning sensor 140 based on a present operation environment of the malfunctioning sensor 140. As discussed above, in the illustrative embodiment, the controller 102 may determine the weight value for each malfunctioning sensor 140 based on the sensor weighting rules 224. As discussed above, the sensor weighting rules 224 define a weight value for each sensor 140 of the compute system 100. Additionally, in some embodiments, the sensor weighting rules 224 may define the weight values for each sensor 140 for different environmental conditions. If the controller 102 detects multiple malfunctioning sensors, the controller 102 is configured to determine a total weight value for all malfunctioning sensors in block 412.

Subsequently, in block 414, the controller 102 determines whether the loss of the one or more malfunctioning sensors 140 is a critical failure for the controller 102, the compute system 100, and/or the automated compute system 150. To do so, the controller 102 may compare the weight value of the malfunctioning sensor 140 (or the total weight value of multiple malfunctioning sensors 140) to a threshold weight value. If the controller 102 determines that the weight or total weight of the malfunctioning sensor(s) 140 does not satisfy the threshold weight value (e.g., is not lower than the threshold value), the controller 102 may determine that the loss of the malfunctioning sensor(s) 140 is critical loss. In such cases, the method 400 advances to block 416 in which the controller 102 responds to the loss (even if temporary) of the malfunctioning sensor(s) 140 as normal critical failure. For example, the controller 102 may shift to a critical failure mode in which only those components of the controller 102, compute system 100, and/or automated compute system 150 required to bring the controller 102, compute system 100, and/or automated compute system 150 to a safe state are powered (e.g., those components required to move an autonomous vehicle to the side of the road).

Referring back to block 414, if the determined weight value of the malfunctioning sensor(s) 140 does satisfy the weight threshold value (e.g., is less than the weight threshold value), the method 400 advances to block 418. In block 418, the controller 102 determines the sensor function of the malfunctioning sensor(s) 140. To do so, the controller 102 may utilize any suitable methodology to determine the sensor function of the malfunctioning sensor 140. In the illustrative embodiment, the controller 102 compares the malfunctioning sensor 140 to the sensor function rules 222 to identify the sensor function previous determined for that particular sensor 140. As discussed above, the controller 102 may utilize a machine learning or deep learning algorithm to determine the particular sensor function of each sensor 140 of the compute system 100 and store such determined function in the sensor function rules 222.

Subsequently, in block 420, the controller 102 determines one or more sensors 140 of the compute system 100 to replace the malfunctioning sensor 140. That is, the controller 102 identifies or selects one or more other sensors 140 that are usable by the controller 102 to perform the sensor function typically performed by the malfunctioning sensor 140. To do so, in the illustrative embodiment, the controller 102 may compare the determined sensor function of the malfunction sensor(s) 140 to the sensor function rules 222 in block 422 to determine which one or more other sensors 140 may be used to perform that particular sensor function. As discussed above, two or more sensors 140 may be selected to, in aggregation, perform the sensor function of the malfunctioning sensor 140.

After the controller 102 has determined the one or more sensors 140 usable to perform the sensor function of the malfunctioning sensor(s) 140 in block 420, the method 400 advances to block 424. In block 424, the controller 102 adjusts the manner in which the sensor data produced from the determined replacement sensor(s) 140 is processed so as to replicate the sensor function of the malfunctioning sensor(s) 140 by the determined replacement sensor(s) 140. For example, in block 426, the controller 102 may adjust (e.g., increase) the allocation of the resources of the processor 110 or other components of the controller 102 used to process the sensor data of the replacement sensor(s) 140. Additionally or alternatively, in block 428, the controller 102 may adjust or modify a processing algorithm used to process the sensor data produced by the replacement sensor(s) 140 so as to extract or obtain additional or new information from the sensor data to facilitate the performance of the sensor function of the malfunctioning sensor 140. Of course, in other embodiments, the controller 102 may increase, adjust, or otherwise modify other characteristics of the manner in which the sensor data of the replacement sensor(s) 140 is typically processed so as to achieve the sensor function of the malfunctioning sensor 140. In doing so, the controller 102 may adjust or modify the processing of the sensor data of multiple replacement sensors 140 in those embodiments in which multiple sensors 140 are used to perform the sensor function of a malfunctioning sensor 140.

After the controller 102 has adjusted the processing of the sensor data of those sensor(s) 140 selected to perform the sensor function of the malfunctioning sensor 140 in block 424, the method 400 advances to block 430. In block 430, the controller 102 continues operation using the determined one or more replacement sensors 140 to perform the sensor function of the malfunctioning sensor 140. In this way, the controller 102 is able to continue operation in a relatively normal fashion even with the loss of one or more sensors 140 by increasing its reliance on other sensors 140 of the compute system 100. Of course, in some embodiments, the use of the replacement sensor(s) 140 to perform the sensor function of the malfunctioning sensor 140 may be temporary. For example, if the malfunctioning sensor 140 is corrected (e.g., its produced sensor data becomes valid or accurate due to improving environmental conditions), the controller 102 may no longer rely on the replacement sensor(s) 140 to perform the function of the malfunctioning sensor 140. Additionally, in some embodiments, it may be desirable to increase or adjust the processing of the sensor data form the replacement sensor(s) 140 for a defined period of time (e.g., so as not to damage components of the controller 102 due to overclocking, overheating, etc.).

EXAMPLES

Illustrative examples of the technologies disclosed herein are provided below. An embodiment of the technologies may include any one or more, and any combination of, the examples described below.

Example 1 includes a compute system for managing sensor malfunctions of the compute system. The compute system includes a plurality of sensors to produce sensor data in response to respective stimulus; a controller to: detect a malfunctioning sensor of the plurality sensors; determine a sensor function of the malfunctioning sensor; determine a different sensor of the plurality of sensors to perform the sensor function of the malfunctioning sensor in response to the detection of the malfunctioning sensor, wherein the different sensor is of a sensor type different from a sensor type of the malfunctioning sensor; and perform the sensor function of the malfunctioning sensor with the different sensor.

Example 2 includes the subject matter of Example 1, and wherein to determine the sensor function of the malfunctioning sensor comprises to determine a stimulus the malfunctioning sensor is to sense during normal operation of the malfunctioning sensor.

Example 3 includes the subject matter of Example 1 or 2, and wherein the different sensor is to produce sensor data that can be analyzed by the controller of the compute system to achieve the sensor function of the malfunctioning sensor.

Example 4 includes the subject matter of Examples 1-3, and wherein the controller comprises a data storage to store a replacement rule that identifies a sensor of the plurality of sensors that is usable by the controller to perform the sensor function of the malfunctioning sensor, wherein to determine the different sensor to perform the sensor function of the malfunctioning sensor comprises to determine the different sensor based on the replacement rule.

Example 5 includes the subject matter of Examples 1-4, and wherein to determine the different sensor to perform the sensor function of the malfunctioning sensor comprises to determine a sensor function of the different sensor.

Example 6 includes the subject matter of Examples 1-5, and wherein to determine the different sensor to perform the sensor function of the malfunctioning sensor comprises to determine a plurality of different sensors of the plurality of sensors to perform the sensor function of the malfunctioning sensor.

Example 7 includes the subject matter of Examples 1-6, and wherein to determine the plurality of different sensors to perform the sensor function of the malfunctioning sensor comprises to determine a plurality of different sensors of the plurality of sensors that, in aggregation, perform the sensor function.

Example 8 includes the subject matter of Examples 1-7, and wherein to determine the plurality of different sensors to perform the sensor function of the malfunctioning sensor comprises to determine a sensor function performed by each of the different sensors.

Example 9 includes the subject matter of Examples 1-8, and wherein to perform the sensor function of the malfunctioning sensor with the different sensor comprises to adjust a process of the controller used to process of sensor data produced by the different sensor.

Example 10 includes the subject matter of Examples 1-9, and wherein to adjust the process of the controller used to process the sensor data produced by the different sensor comprises to increase an allocation of resources of a processor of the controller, wherein the allocation of resources of the processor are dedicated to process the sensor data of the different sensor.

Example 11 includes the subject matter of Examples 1-10, and wherein to adjust the process of the controller used to process the sensor data produced by the different sensor comprises to modify a process algorithm used by the controller to process the sensor data of the different sensor.

Example 12 includes the subject matter of Examples 1-11, and wherein to adjust the process used by the controller to process the sensor data produced by the different sensor comprises to process the sensor data of the different sensor to obtain information indicative of the sensor function of the malfunctioning sensor.

Example 13 includes the subject matter of Examples 1-12, and wherein the different sensor is used by the controller to perform a first sensor function, and wherein to perform the sensor function of the malfunctioning sensor comprises to use the different sensor to perform a second function different from the first sensor function.

Example 14 includes the subject matter of Examples 1-13, and wherein the controller is further to determine a weight value for the malfunctioning sensor; determine whether the weight value satisfies a threshold value; wherein to determine the different sensor of the plurality of sensors to perform the sensor function of the malfunctioning sensor comprises to determine a different sensor of the plurality of sensors to perform the sensor function of the malfunctioning sensor in response to a determination that the weight value satisfies the threshold value.

Example 15 includes the subject matter of Examples 1-14, and wherein the controller is further to enter a failure operation mode in response to a determination that the weight value does not satisfy the threshold value.

Example 16 includes the subject matter of Examples 1-15, and wherein to determine the weight value for the malfunctioning sensor comprises to determine a weight value for the malfunctioning sensor based on the determined sensor function of the malfunctioning sensor.

Example 17 includes the subject matter of Examples 1-16, and wherein to determine the weight value for the malfunctioning sensor comprises to determine a weight value for the malfunctioning sensor based on an operation environment of the malfunctioning sensor.

Example 18 includes the subject matter of Examples 1-17, and wherein to detect the malfunctioning sensor of the plurality of sensors comprises to detect a plurality of malfunctioning sensors of the plurality of sensors, and wherein the sensor malfunction management module is further to determine a weight value for each of the plurality of malfunctioning sensors; determine a total weight value based on the sum of the weight values of the plurality of malfunctioning sensors; and determine whether the total weight value satisfies a threshold value, wherein to determine the different sensor of the plurality of sensors to perform the sensor function of the malfunctioning sensor comprises to determine a set of different sensors of the plurality of sensors to perform a sensor function of each sensor of the plurality of malfunctioning sensors in response to a determination that the weight value satisfies the threshold value.

Example 19 includes the subject matter of Examples 1-18, and wherein to detect the malfunctioning sensor comprises to detect the malfunctioning sensor based on an analysis of sensor data produced by the malfunctioning sensor.

Example 20 includes the subject matter of Examples 1-19, and wherein to detect the malfunctioning sensor comprises to determine an operation environment of a sensor of the plurality of sensors; and determine whether the sensor is a malfunctioning sensor based on the determined operation environment.

Example 21 includes the subject matter of Examples 1-20, and wherein to detect the malfunctioning sensor comprises to determine an operational characteristic of a sensor of the plurality of sensors; and determine that the sensor is a malfunctioning sensor based on the determined operational characteristic of the sensor.

Example 22 includes the subject matter of Examples 1-12, and wherein the controller comprises a data storage to store a verification rule that defines a range of valid operational values for an operational characteristic of the plurality of sensors, and wherein to detect the malfunctioning sensor comprises to compare an operational characteristic of a sensor of the plurality of sensors to the verification rule to determine whether the sensor is a malfunctioning sensor.

Example 23 includes a method for managing sensor malfunctions in a compute system, the method comprising detecting, by a controller of the compute system, a malfunctioning sensor of the compute system; determining, by the controller, a sensor function of the malfunctioning sensor;

determining, by the controller, a different sensor of the compute system to perform the sensor function of the malfunctioning sensor in response to detecting the malfunctioning sensor, wherein the different sensor is of a sensor type different from a sensor type of the malfunctioning sensor; and performing, by the controller, the sensor function of the malfunctioning sensor using the different sensor.

Example 24 includes the subject matter of Example 23, and wherein determining the sensor function of the malfunctioning sensor comprises determining a stimulus the malfunctioning sensor is to sense during normal operation of the malfunctioning sensor.

Example 25 includes the subject matter of Examples 23 or 24, and wherein determining the different sensor to perform the sensor function of the malfunctioning sensor comprises determining a different sensor of the system capable of producing sensor data that can be analyzed by the controller to achieve the sensor function of the malfunctioning sensor.

Example 26 includes the subject matter of Examples 23-25, and wherein determining the different sensor to perform the sensor function of the malfunctioning sensor comprises determining a different sensor to perform the sensor function of the malfunctioning sensor based on a replacement rule, wherein the replacement rule identifies a sensor of the compute system capable of performing the sensor function of the malfunctioning sensor.

Example 27 includes the subject matter of Examples 23-26, and wherein determining the different sensor to perform the sensor function of the malfunctioning sensor comprises determining a sensor function of the different sensor.

Example 28 includes the subject matter of Examples 23-27, and wherein determining the different sensor to perform the sensor function of the malfunctioning sensor comprises determining a plurality of different sensors to perform the sensor function of the malfunctioning sensor.

Example 29 includes the subject matter of Examples 23-28, and wherein determining the plurality of different sensors to perform the sensor function of the malfunctioning sensor comprises determining a plurality of different sensors that, in aggregation, perform the sensor function.

Example 30 includes the subject matter of Examples 23-29, and wherein determining the plurality of different sensors to perform the sensor function of the malfunctioning sensor comprises determining a sensor function performed by each of the different sensors.

Example 31 includes the subject matter of Examples 23-30, and wherein performing the sensor function of the malfunctioning sensor using the different sensor comprises adjusting the processing of sensor data produced by the different sensor.

Example 32 includes the subject matter of Examples 23-31, and wherein adjusting the processing of sensor data produced by the different sensor comprises increasing an allocation of resources of a processor of the controller dedicated to processing the sensor data of the different sensor.

Example 33 includes the subject matter of Examples 23-32, and wherein adjusting the processing of sensor data produced by the different sensor comprises modifying a processing algorithm used to process the sensor data of the different sensor.

Example 34 includes the subject matter of Examples 23-33, and wherein adjusting the processing of sensor data produced by the different sensor comprises processing the sensor data of the different sensor to obtain information indicative of the sensor function of the malfunctioning sensor.

Example 35 includes the subject matter of Examples 23-34, and further comprising using the different sensor to perform a first sensor function, wherein performing the sensor function of the malfunctioning sensor comprises using the different sensor to perform a second function different from the first sensor function.

Example 36 includes the subject matter of Examples 23-35, and further comprising determining, by the controller, a weight value for the malfunctioning sensor; determining, by the controller, whether the weight value satisfies a threshold value; wherein determining the different sensor of the compute system to perform the sensor function of the malfunctioning sensor comprises determining a different sensor of the compute system to perform the sensor function of the malfunctioning sensor in response to a determination that the weight value satisfies the threshold value.

Example 37 includes the subject matter of Examples 23-36, and further comprising entering, by the controller, a failure operation mode in response to a determination that the weight value does not satisfy the threshold value.

Example 38 includes the subject matter of Examples 23-37, and wherein determining the weight value for the malfunctioning sensor comprises determining a weight value for the malfunctioning sensor based on the determined sensor function of the malfunctioning sensor.

Example 39 includes the subject matter of Examples 23-38, and wherein determining the weight value for the malfunctioning sensor comprises determining a weight value for the malfunctioning sensor based on an operation environment of the malfunctioning sensor.

Example 40 includes the subject matter of Examples 23-39, and wherein detecting a malfunctioning sensor of the compute system comprises detecting a plurality of malfunctioning sensors of the compute system, and further comprising determining, by the controller, a weight value for each of the plurality of malfunctioning sensors; determining, by the controller, a total weight value based on the sum of the weight values of the plurality of malfunctioning sensors; and determining, by the controller, whether the total weight value satisfies a threshold value, wherein determining the different sensor of the compute system to perform the sensor function of the malfunctioning sensor comprises determining a set of different sensors of the compute system to perform a sensor function of each sensor of the plurality of malfunctioning sensors in response to a determination that the weight value satisfies the threshold value.

Example 41 includes the subject matter of Examples 23-40, and wherein detecting the malfunctioning sensor comprises detecting the malfunctioning sensor based on an analysis of sensor data produced by the malfunctioning sensor.

Example 42 includes the subject matter of Examples 23-41, and wherein detecting the malfunctioning sensor comprises determining, by the controller, an operation environment of a sensor of the compute system; and determining, by the controller, whether the sensor is a malfunctioning sensor based on the determined operation environment.

Example 43 includes the subject matter of Examples 23-42, and wherein detecting the malfunctioning sensor comprises determining, by the controller, an operational characteristic of a sensor of the compute system; and determining, by the controller, that the sensor is a malfunctioning sensor based on the determined operational characteristic of the sensor.

Example 44 includes the subject matter of Examples 23-43, and wherein detecting the malfunctioning sensor comprises comparing, by the controller, an operational characteristic of a sensor of the controller to a verification rule to determine whether the sensor is a malfunctioning sensor, wherein the verification rule defines a range of valid operational values for the operational characteristic.

Example 45 includes one or more computer-readable storage media comprising a plurality of instructions that, when executed, cause a compute system to perform the method of any of Examples 23-44.

Example 46 includes a compute system for managing sensor conflicts of the compute system. The compute system includes means for detecting a malfunctioning sensor of the compute system; means for determining a sensor function of the malfunctioning sensor; means for determining a different sensor of the compute system to perform the sensor function of the malfunctioning sensor in response to detecting the malfunctioning sensor, wherein the different sensor is of a sensor type different from a sensor type of the malfunctioning sensor; and means for performing the sensor function of the malfunctioning sensor using the different sensor.

Example 47 includes the subject matter of Example 46, and wherein the means for determining the sensor function of the malfunctioning sensor comprises means for determining a stimulus the malfunctioning sensor is to sense during normal operation of the malfunctioning sensor.

Example 48 includes the subject matter of Example 46 or 47, and wherein the means for determining the different sensor to perform the sensor function of the malfunctioning sensor comprises means for determining a different sensor of the system capable of producing sensor data that can be analyzed by the controller to achieve the sensor function of the malfunctioning sensor.

Example 49 includes the subject matter of any of Examples 46-48, and wherein the means for determining the different sensor to perform the sensor function of the malfunctioning sensor comprises means for determining a different sensor to perform the sensor function of the malfunctioning sensor based on a replacement rule, wherein the replacement rule identifies a sensor of the compute system capable of performing the sensor function of the malfunctioning sensor.

Example 50 includes the subject matter of any of Examples 46-49, and wherein the means for determining the different sensor to perform the sensor function of the malfunctioning sensor means for comprises determining a sensor function of the different sensor.

Example 51 includes the subject matter of any of Examples 46-50, and wherein the means for determining the different sensor to perform the sensor function of the malfunctioning sensor comprises means for determining a plurality of different sensors to perform the sensor function of the malfunctioning sensor.

Example 52 includes the subject matter of any of Examples 46-51, and wherein the means for determining the plurality of different sensors to perform the sensor function of the malfunctioning sensor comprises means for determining a plurality of different sensors that, in aggregation, perform the sensor function.

Example 53 includes the subject matter of any of Examples 46-52, and wherein the means for determining the plurality of different sensors to perform the sensor function of the malfunctioning sensor comprises means for determining a sensor function performed by each of the different sensors.

Example 54 includes the subject matter of any of Examples 46-53, and wherein the means for performing the sensor function of the malfunctioning sensor using the different sensor comprises means for adjusting the processing of sensor data produced by the different sensor.

Example 55 includes the subject matter of any of Examples 46-54, and wherein the means for adjusting the processing of sensor data produced by the different sensor comprises means for increasing an allocation of resources of a processor of the controller dedicated to processing the sensor data of the different sensor.

Example 56 includes the subject matter of any of Examples 46-55, and wherein the means for adjusting the processing of sensor data produced by the different sensor comprises means for modifying a processing algorithm used to process the sensor data of the different sensor.

Example 57 includes the subject matter of any of Examples 46-56, and wherein the means for adjusting the processing of sensor data produced by the different sensor comprises means for processing the sensor data of the different sensor to obtain information indicative of the sensor function of the malfunctioning sensor.

Example 58 includes the subject matter of any of Examples 46-57, and further comprising means for using the different sensor to perform a first sensor function, wherein the means for performing the sensor function of the malfunctioning sensor comprises means for using the different sensor to perform a second function different from the first sensor function.

Example 59 includes the subject matter of any of Examples 46-58, and further comprising means for determining a weight value for the malfunctioning sensor; means for determining whether the weight value satisfies a threshold value; wherein the means for determining the different sensor of the compute system to perform the sensor function of the malfunctioning sensor comprises means for determining a different sensor of the compute system to perform the sensor function of the malfunctioning sensor in response to a determination that the weight value satisfies the threshold value.

Example 60 includes the subject matter of any of Examples 46-59, and further comprising means for entering a failure operation mode in response to a determination that the weight value does not satisfy the threshold value.

Example 61 includes the subject matter of any of Examples 46-60, and wherein the means for determining the weight value for the malfunctioning sensor comprises means for determining a weight value for the malfunctioning sensor based on the determined sensor function of the malfunctioning sensor.

Example 62 includes the subject matter of any of Examples 46-61, and wherein the means for determining the weight value for the malfunctioning sensor comprises means for determining a weight value for the malfunctioning sensor based on an operation environment of the malfunctioning sensor.

Example 63 includes the subject matter of any of Examples 46-62, and wherein the means for detecting a malfunctioning sensor of the compute system comprises means for detecting a plurality of malfunctioning sensors of the compute system, and further comprising means for determining a weight value for each of the plurality of malfunctioning sensors; means for determining a total weight value based on the sum of the weight values of the plurality of malfunctioning sensors; and means for determining whether the total weight value satisfies a threshold value, wherein the means for determining the different sensor of the compute system to perform the sensor function of the malfunctioning sensor comprises means for determining a set of different sensors of the compute system to perform a sensor function of each sensor of the plurality of malfunctioning sensors in response to a determination that the weight value satisfies the threshold value.

Example 64 includes the subject matter of any of Examples 46-63, and wherein the means for detecting the malfunctioning sensor comprises means for detecting the malfunctioning sensor based on an analysis of sensor data produced by the malfunctioning sensor.

Example 65 includes the subject matter of any of Examples 46-64, and wherein the means for detecting the malfunctioning sensor comprises means for determining an operation environment of a sensor of the compute system; and means for determining whether the sensor is a malfunctioning sensor based on the determined operation environment.

Example 66 includes the subject matter of any of Examples 46-65, and wherein the means for detecting the malfunctioning sensor comprises means for determining an operational characteristic of a sensor of the compute system; and means for determining that the sensor is a malfunctioning sensor based on the determined operational characteristic of the sensor.

Example 67 includes the subject matter of any of Examples 46-66, and wherein the means for detecting the malfunctioning sensor comprises means for comparing an operational characteristic of a sensor of the controller to a verification rule to determine whether the sensor is a malfunctioning sensor, wherein the verification rule defines a range of valid operational values for the operational characteristic.

The invention claimed is:

1. A compute system for managing sensor malfunctions of the compute system, the compute system comprising:
   a plurality of sensors to produce sensor data in response to respective stimulus;
   a controller to:
      detect a malfunctioning sensor of the plurality sensors;
      determine a sensor function of the malfunctioning sensor;
      determine a different sensor of the plurality of sensors to perform the sensor function of the malfunctioning sensor in response to the detection of the malfunctioning sensor, wherein the different sensor is of a sensor type different from a sensor type of the malfunctioning sensor; and
      perform the sensor function of the malfunctioning sensor with the different sensor, wherein to perform the sensor function of the malfunctioning sensor with the different sensor comprises to modify a process algorithm used by the controller to process the sensor data of the malfunctioning sensor to process sensor data produced by the different sensor to perform the sensor function.

2. The compute system of claim 1, wherein to determine the sensor function of the malfunctioning sensor comprises to determine a stimulus the malfunctioning sensor is to sense during normal operation of the malfunctioning sensor.

3. The compute system of claim 1, wherein to determine the different sensor to perform the sensor function of the malfunctioning sensor comprises to determine a plurality of different sensors of the plurality of sensors to perform the sensor function of the malfunctioning sensor.

4. The compute system of claim 3, wherein to determine the plurality of different sensors to perform the sensor function of the malfunctioning sensor comprises to determine a plurality of different sensors of the plurality of sensors that, in aggregation, perform the sensor function.

5. The compute system of claim 1, wherein to perform the sensor function of the malfunctioning sensor with the different sensor further comprises to increase an allocation of resources of a processor of the controller, wherein the allocation of resources of the processor are dedicated to process the sensor data of the different sensor.

6. The compute system of claim 1, wherein to perform the sensor function of the malfunctioning sensor with the different sensor further comprises to process the sensor data of the different sensor to obtain information indicative of the sensor function of the malfunctioning sensor.

7. The compute system of claim 1, wherein the controller is further to:
   determine a weight value for the malfunctioning sensor;
   determine whether the weight value satisfies a threshold value;
   wherein to determine the different sensor of the plurality of sensors to perform the sensor function of the malfunctioning sensor comprises to determine a different sensor of the plurality of sensors to perform the sensor function of the malfunctioning sensor in response to a determination that the weight value satisfies the threshold value.

8. A method for managing sensor malfunctions in a compute system, the method comprising:
   detecting, by a controller of the compute system, a malfunctioning sensor of the compute system;
   determining, by the controller, a sensor function of the malfunctioning sensor;
   determining, by the controller, a different sensor of the compute system to perform the sensor function of the malfunctioning sensor in response to detecting the malfunctioning sensor, wherein the different sensor is of a sensor type different from a sensor type of the malfunctioning sensor; and
   performing, by the controller, the sensor function of the malfunctioning sensor using the different sensor, wherein performing the sensor function of the malfunctioning sensor using the different sensor comprises modifying a process algorithm used by the controller to process the sensor data of the malfunctioning sensor to process sensor data produced by the different sensor to perform the sensor function.

9. The method of claim 8, wherein determining the sensor function of the malfunctioning sensor comprises determining a stimulus the malfunctioning sensor is to sense during normal operation of the malfunctioning sensor.

10. The method of claim 8, wherein determining the different sensor to perform the sensor function of the malfunctioning sensor comprises determining a plurality of different sensors to perform the sensor function of the malfunctioning sensor.

11. The method of claim 8, wherein performing the sensor function of the malfunctioning sensor with the different sensor further comprises increasing an allocation of resources of a processor of the controller dedicated to processing the sensor data of the different sensor.

12. The method of claim 8, wherein performing the sensor function of the malfunctioning sensor with the different sensor further comprises processing the sensor data of the different sensor to obtain information indicative of the sensor function of the malfunctioning sensor.

13. The method of claim 8, further comprising:
   determining, by the controller, a weight value for the malfunctioning sensor;
   determining, by the controller, whether the weight value satisfies a threshold value;
   wherein determining the different sensor of the compute system to perform the sensor function of the malfunctioning sensor comprises determining a different sensor of the compute system to perform the sensor function of the malfunctioning sensor in response to a determination that the weight value satisfies the threshold value.

14. One or more non-transitory, computer-readable storage media comprising a plurality of instructions that, when executed, cause a compute system to:
   detect a malfunctioning sensor of the compute system;
   determine a sensor function of the malfunctioning sensor;
   determine a different sensor of the compute system to perform the sensor function of the malfunctioning sensor in response to detecting the malfunctioning sensor, wherein the different sensor is of a sensor type different from a sensor type of the malfunctioning sensor; and
   perform the sensor function of the malfunctioning sensor using the different sensor, wherein to perform the sensor function of the malfunctioning sensor using the different sensor comprises to modify a process algorithm used by the controller to process the sensor data of the malfunctioning sensor to process sensor data produced by the different sensor to perform the sensor function.

15. The one or more non-transitory, computer-readable storage media of claim 14, wherein to determine the sensor function of the malfunctioning sensor comprises to determine a stimulus the malfunctioning sensor is to sense during normal operation of the malfunctioning sensor.

16. The one or more non-transitory, computer-readable storage media of claim 14, wherein to determine the different sensor to perform the sensor function of the malfunctioning sensor comprises to determine a plurality of different sensors to perform the sensor function of the malfunctioning sensor.

17. The one or more non-transitory, computer-readable storage media of claim 14, wherein to perform the sensor function of the malfunctioning sensor with the different sensor further comprises to increase an allocation of resources of a processor of the controller dedicated to processing the sensor data of the different sensor.

18. The one or more non-transitory, computer-readable storage media of claim 14, wherein to perform the sensor function of the malfunctioning sensor with the different sensor further comprises to process the sensor data of the different sensor to obtain information indicative of the sensor function of the malfunctioning sensor.

19. The one or more non-transitory, computer-readable storage media of claim 14, wherein the plurality of instructions, when executed, further cause the compute system to:
   determine a weight value for the malfunctioning sensor;
   determine whether the weight value satisfies a threshold value;
   wherein to determine the different sensor of the compute system to perform the sensor function of the malfunctioning sensor comprises to determine a different sensor of the compute system to perform the sensor function of the malfunctioning sensor in response to a determination that the weight value satisfies the threshold value.

\* \* \* \* \*